No. 738,025. PATENTED SEPT. 1, 1903.
E. R. GILL.
DRY CELL BATTERY.
APPLICATION FILED DEC. 20, 1901.
NO MODEL.

Witnesses
Edward Rowland
Samuel C. E. Carpenter

Edwin R. Gill
Inventor
By his Attorney H. H. MacKaye

No. 738,025. Patented September 1, 1903.

UNITED STATES PATENT OFFICE.

EDWIN R. GILL, OF NEW YORK, N. Y., ASSIGNOR TO ELECTRIC CONTRACT COMPANY, A CORPORATION OF NEW JERSEY.

DRY-CELL BATTERY.

SPECIFICATION forming part of Letters Patent No. 738,025, dated September 1, 1903.

Application filed December 20, 1901. Serial No. 86,636. (No model.)

*To all whom it may concern:*

Be it known that I, EDWIN R. GILL, a citizen of the United States, residing in the city, county, and State of New York, have invented a certain new and useful Improvement in Dry Battery-Cells, of which the following is a specification.

My invention has relation to an improved dry battery-cell having the best possible electrical and mechanical qualities and which can be cheaply and uniformly made.

My invention is illustrated in a preferred form in the accompanying drawings, wherein—

Figure 1:
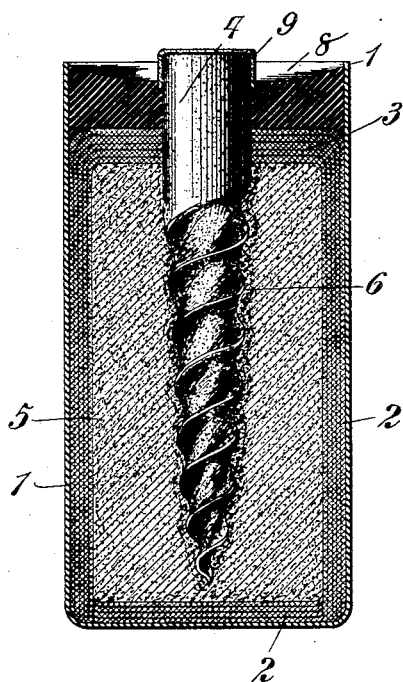
Figure 2:
Figure 3:
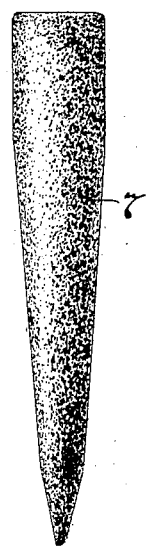

Figure 1 is a central longitudinal section of one form of dry cell made in accordance with my invention. Fig. 2 shows an elevation of the carbon electrode used in the cell in Fig. 1, and Fig. 3 is an elevation of an alternative form of carbon electrode capable of use with my invention.

In the great majority of dry cells as at present manufactured the positive electrode takes the form of a metal cup, usually zinc, within which is placed a powdered compound containing the electrolyte, the negative electrode being placed in the center of the cup in the midst of the powdered compound. If this powder is packed too tightly, circulation of gas is impeded, and room for the gas not being provided the cell is apt to burst. On the other hand, if the powder is too loosely applied the internal resistance is too great. I find it best to effect a compromise by charging each cell with powder under moderate packing-pressure and compressing the powder hard against the immediate surface of the interior electrode. This end it is difficult to secure with uniformity where the interior electrode is put in place first and the powder is packed around it, as in the present practice. I have found, however, that uniform results of an advantageous nature are attained by first packing the cell with powder under moderate pressure and then forcing a pointed electrode into its center. This process forms the essential part of my invention.

In the drawings the zinc or other suitable metal shell is shown at 1. Within this is placed the usual lining of damp absorbent material 2, the top being turned over, as at 3, leaving a central opening for the carbon or other suitable electrode 4. The form taken by this absorbent material, whether in one, two, or more pieces, is immaterial to my invention. The top layer thereof may or may not be in one piece with that which lines the cylindrical wall.

The cell having been lined at the bottom and sides with absorbent material, the electrolytic powder 5 is charged within the lining and compressed to a suitable degree, the same being preferably first moistened uniformly to the desired degree.

Either before or after the top absorbent lining 3 is formed the pointed carbon rod 4 is forced into the center of the powder.

As shown in Fig. 2, the preferred carbon electrode is formed with a tapering screw-thread 6, and in pressing the electrode into place it is twisted, so that the effect of the threads is to aid any other pressure applied. The effect of thus forcing the electrode into the powder is to compress the latter around the carbon, as indicated by the darker shading in Fig. 1. I prefer the screw-carbon, as it affords a greater surface, and therefore decreased internal resistance. My invention is not confined to this form of electrode, however, as I have had good results with the electrode shown in Fig. 3. This is a plain-pointed or conical rod 7, which is simply pressed or driven into the center of the powder, producing the desired compression all around its surface. The interior electrode being thus placed and the powder covered by a proper protective layer 3, the usual sealing material is applied, as at 8, and the cell is complete.

I have found it well for some purposes to supply a metal conducting-cap 9 on the head of the electrode 4.

What I claim is—

1. As an article of manufacture, a dry cell having a pointed interior electrode and an appropriate interior compound more closely packed against said electrode than farther out.

2. As an article of manufacture, a dry cell having an interior electrode in the form of a conical screw and an appropriate interior compound more closely packed against said electrode than farther out.

3. As an article of manufacture an electrode for dry cells in the form of a pointed screw.

EDWIN R. GILL.

Witnesses:
F. W. LONGFELLOW,
H. S. MACKAYE.